(12) United States Patent
Kaneta

(10) Patent No.: US 7,029,789 B2
(45) Date of Patent: Apr. 18, 2006

(54) FLAT-TYPE CELL AND COMBINED BATTERY UTILIZING THE SAME

(75) Inventor: Hiroshi Kaneta, Tokyo (JP)

(73) Assignee: NEC Corporation, Tokyo (JP)

( * ) Notice: Subject to any disclaimer, the term of this patent is extended or adjusted under 35 U.S.C. 154(b) by 363 days.

(21) Appl. No.: 10/352,134

(22) Filed: Jan. 28, 2003

(65) Prior Publication Data

US 2003/0148178 A1     Aug. 7, 2003

(30) Foreign Application Priority Data

Feb. 1, 2002  (JP) .............................. 2002/026147

(51) Int. Cl.
*H01M 2/26* (2006.01)
*H01M 2/02* (2006.01)
*H01M 2/08* (2006.01)

(52) U.S. Cl. ................ 429/160; 429/162; 429/176; 429/185

(58) Field of Classification Search ............... 429/152, 429/160, 161, 162, 176, 178, 185
See application file for complete search history.

(56) References Cited

U.S. PATENT DOCUMENTS

| | | | | |
|---|---|---|---|---|
| 2,631,180 A | * | 3/1953 | Robinson | 429/162 X |
| 3,770,505 A | * | 11/1973 | Bergum et al. | 429/152 |
| 3,920,477 A | * | 11/1975 | Alaburda | 429/162 |
| 4,051,304 A | * | 9/1977 | Snook | 429/160 X |
| 4,409,304 A | * | 10/1983 | Gerard et al. | 429/158 |
| 6,296,971 B1 | * | 10/2001 | Hara | 429/185 X |

FOREIGN PATENT DOCUMENTS

| | | | |
|---|---|---|---|
| JP | 9-259859 A | | 10/1997 |
| JP | 11-162516 | * | 11/1997 |
| JP | 10-233201 A | | 9/1998 |
| JP | 11-260414 A | | 9/1999 |
| JP | 2001-035476 | * | 2/2001 |
| JP | H13-176467 A1 | | 6/2001 |
| JP | 2001-216950 A | | 8/2001 |

* cited by examiner

Primary Examiner—Stephen J. Kalafut
(74) Attorney, Agent, or Firm—Sughrue Mion, PLLC

(57) ABSTRACT

The battery is constituted to satisfy $B/A \geq 0.57$, wherein "A" represents a width of an active material region and "B" represents a width of each electrode terminal.

11 Claims, 15 Drawing Sheets

12

12

12

12

12

12

12

12

12

FLAT-TYPE CELL AND COMBINED BATTERY UTILIZING THE SAME

BACKGROUND OF THE INVENTION

1. Field of the Invention

The present invention relates to a flat-type cell and a combined battery utilizing the same.

2. Description of the Prior Art

Conventionally, there have been adopted battery cans made of metal as packages of batteries, while adjusting the sizes of cans into shapes of a cylinder, a rectangle and a coin corresponding to the usage. Recently, particularly in the field of portable equipment which is thin and light-weight, there has been a strong demand to attain a thin and light-weigh battery as a power source corresponding to such portable equipment.

Since those batteries adopting battery cans made of metal have a limitation on how thin and light-weight they can be, recent investigation have been conducted to develop batteries adopting packages constituted by thermally sealing a laminated film comprising laminated resin films and metal films, to thereby produce a film armored battery which is remarkably light-weight and thin.

However, at the time of charging and discharging of such a battery, heat is generated from electrode terminals and battery elements due to the presence of the resistance of the electrode terminals and the internal resistance of the battery, thereby causing a possibility of the breakage of the sealed portion by the thus generated heat. Such a breakage of the sealed portion causes a moisture content to intrude into the package to cause a considerable deterioration of the battery performance, thereby leading to lowered reliability.

Various known techniques exist concerning combined batteries constituted of a plurality of film armored batteries. For example, combined batteries disclosed in JP-A-2001-216950 and JP-A-HEI-9-259859 (259859/1997) are mainly directed to use in portable electronic equipment, and are not intended to be used under an increased electric current. Thus, it is difficult to directly divert such combined batteries to unintended usage under an increased electric current.

Meanwhile, it has recently become popular to use film armored batteries for powering electric vehicles and ships requiring larger electric current supplies. In such usage, numerous cells are connected and used as a combined battery so as to attain a higher voltage and a larger capacity, thereby leading to a considerably higher heat generation than a situation for individually using the cells. As such, temperatures of a combined battery have been raised as a whole, in addition to the above-mentioned adverse effects. Excessively raised temperatures may shorten the service life of the battery or damage it. Particularly, in case of a lithium-ion battery such as one adopting an organic solvent as electrolyte and adopting carbon as an active material of negative electrode, it could cause a risk of inflammation to the surroundings when the battery is damaged by unusually higher temperatures.

SUMMARY OF THE INVENTION

In view of the above circumstances, it is therefore an object of the present invention to provide a film armored battery of a reduced heat generation from battery elements and electrode terminals to thereby attain a higher reliability.

To solve the above problem, the present invention provides a flat-type cell comprising a positive electrode terminal and a negative electrode terminal which are mutually separated and drawn out from an outer peripheral edge of the flat-type cell, characterized in that the positive electrode terminal and the negative electrode terminal satisfy:

$$B/A \geq 0.57$$

(wherein "A" represents a width of an active material region width and "B" represents a width of each electrode terminal).

The width of the active material region in the present invention means a width of that region of the positive electrode body or negative electrode body in which the active material is present, and means the narrowest width of the active material region in a direction perpendicular to the extending direction of the electrode terminal. When the active material region is rectangular, the width of the active material region coincides with the length of the side from which the pertinent electrode terminal is taken out, i.e., coincides with the length of that side where the pertinent electrode terminal is extended.

In conventional batteries having a plurality of terminals at one side, B/A was less than 0.5. Further, JP-A-HEI-9-259859 (259859/1997) discloses a battery adopting a constitution in which electrode terminals are drawn into outer peripheral recesses of the battery, respectively. This aims at ensuring planar regions of battery element portions to thereby attain a higher voltage and a higher capacity, while intending a compact outline by drawing the electrode terminals into the outer peripheral recesses, respectively. In view of such an intention, there are no reasons to positively widen the electrode terminals, and it is rather disadvantageous to widen the electrodes from a standpoint of voltage and capacity. Contrarily, $B/A \geq 0.57$ in the present invention, shortens the electric current traveling distances and reduces the internal resistance. This results in a restricted heat generation from battery elements. Further, the increased widths of electrode terminals will reduce the resistance of electrode terminals, thereby also restricting heat generation from the electrode terminals. Moreover, connection is facilitated, and the mechanical strength of the electrode terminals is increased.

The present invention further provides a flat-type cell according to the above, characterized in that the positive electrode terminal and the negative electrode terminal are drawn out in a mutually opposing manner.

The positive electrode terminal and the negative electrode terminal are drawn out in a mutually opposing manner, so that the connection is facilitated upon stacking the cells into a combined battery. Further, by changing the orientations of individual cells, it becomes possible to obtain combined batteries having various connections such as series-connected, parallel-connected, and series/parallel-connected combined batteries.

The present invention additionally provides a flat-type cell according to the above, characterized in that the flat-type cell further comprises a package made of a thin metal film.

This allows the lightening of the package and avoids intrusion of moisture content into the package.

The present invention further provides a flat-type cell according to the above, characterized in that the flat-type cell includes a package comprising a laminated film, and that the laminated film includes a thin metal film and a heat sealable resin film.

This readily and assuredly enables the joining of the film package.

The present invention provides a flat-type cell according to the above, characterized in that the thin metal film is aluminum.

This allows the lightening of the package.

The present invention provides a combined battery comprising a plurality of the flat-type cells according to the above, wherein the flat-type cells are combined with one another through the positive electrode terminals or the negative electrode terminals.

The present invention further provides a combined battery according to the above, characterized in that the plurality of flat-type cells are series connected, respectively.

The present invention further provides a combined battery according to the above, characterized in that the plurality of flat-type cells are stacked.

The present invention further provides a combined battery according to the above, characterized in that the plurality of stacked flat-type cells are mutually parallel connected.

The present invention provides a combined battery comprising a plurality of the combined batteries according to the above which are mutually series connected.

Combining a plurality of the aforementioned flat-type cells provides a combined battery having a desired voltage and a desired capacity. In the combined battery, the internal resistance and the resistances of electrode terminals have been decreased in each flat-type cell, thereby allowing the effective restriction of heat generation upon charging and discharging by an increased electric current, to thereby reduce the temperature rise of the combined battery as a whole. Further, it becomes unnecessary to conduct a heat-dissipation countermeasure construction to be otherwise applied to electrode terminals, thereby enabling the constitution of a combined battery which is light-weight and inexpensive and has a higher reliability. Further, it becomes possible to obtain combined batteries of series-connection type, parallel-connection type and series/parallel-connection type which have arbitrary layouts and effectively utilize the given spaces, such as by aligning multiple cells in the plane direction, by vertically stacking and connecting cells, or by combining such action.

DESCRIPTION OF THE PREFERRED EMBODIMENTS

There will be described hereinafter an exemplary embodiment according to the present invention, with reference to the accompanying drawings.

Figure 1:
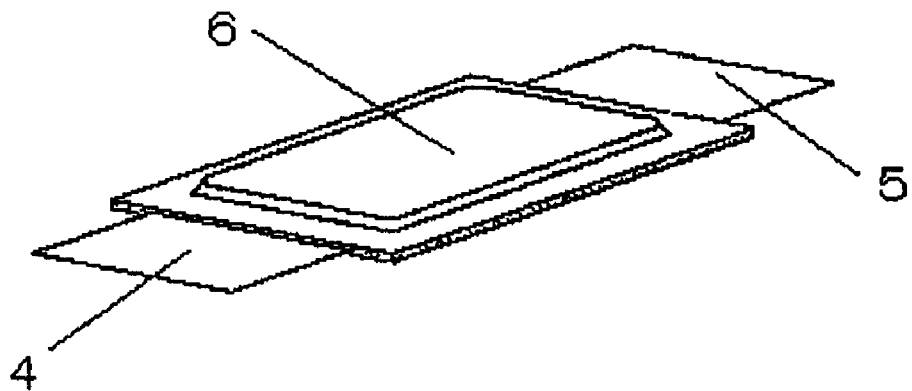
FIG. 1 is a perspective view of a film armored battery of the present invention.
Figure 2:
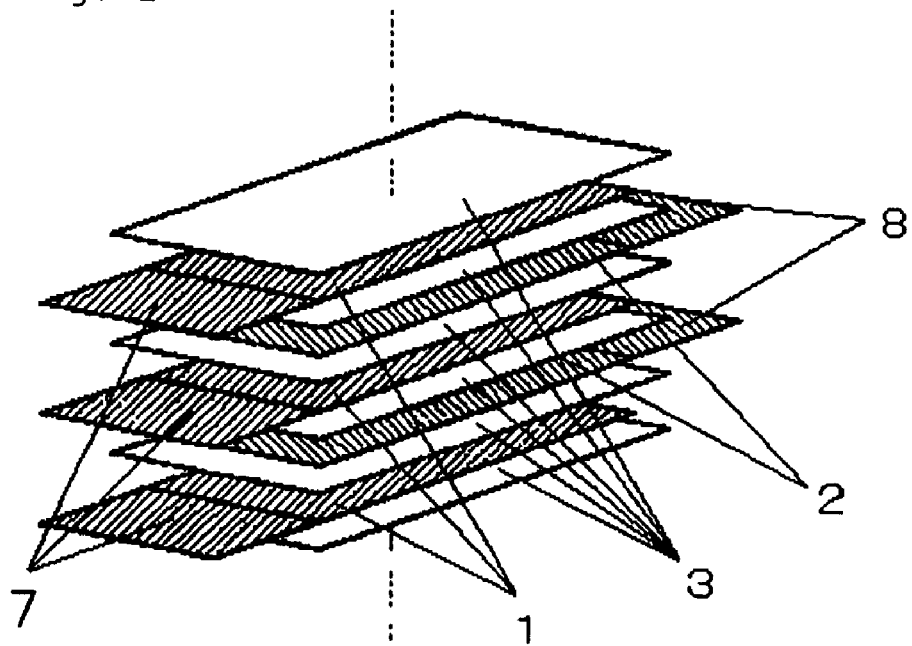
FIG. 2 is an enlarged perspective view of battery elements of the film armored battery of the present invention.
Figure 3:
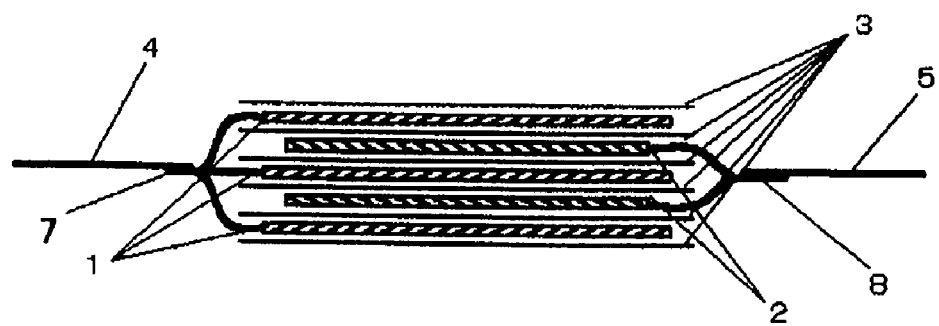
FIG. 3 is a cross-sectional view of battery elements of the film armored battery of the present invention.

FIG. 1 is a perspective view of a film armored battery according to the present invention, FIG. 2 is an exploded perspective view of battery elements of the battery of FIG. 1, and FIG. 3 is a cross-sectional view of the battery elements. As shown in FIG. 3, negative electrode bodies 1 and positive electrode bodies 2 are alternately arranged in spaces separated by laminated type separators 3, respectively, and there is provided a negative electrode terminal 4 via negative electrode collecting portions 7 extended from the distal ends of the negative electrode bodies 1, respectively. Also concerning the positive electrode, there is provided a positive electrode terminal 5 via positive electrode collecting portions 8 extended from the distal ends of the positive electrode bodies 2, respectively. Further, the negative electrode collecting portions 7 and positive electrode collecting portions 8 are extended in the mutually opposite directions, respectively, as shown in FIG. 3, and so are the negative electrode terminal 4 and positive electrode terminal 5.

Figure 4:
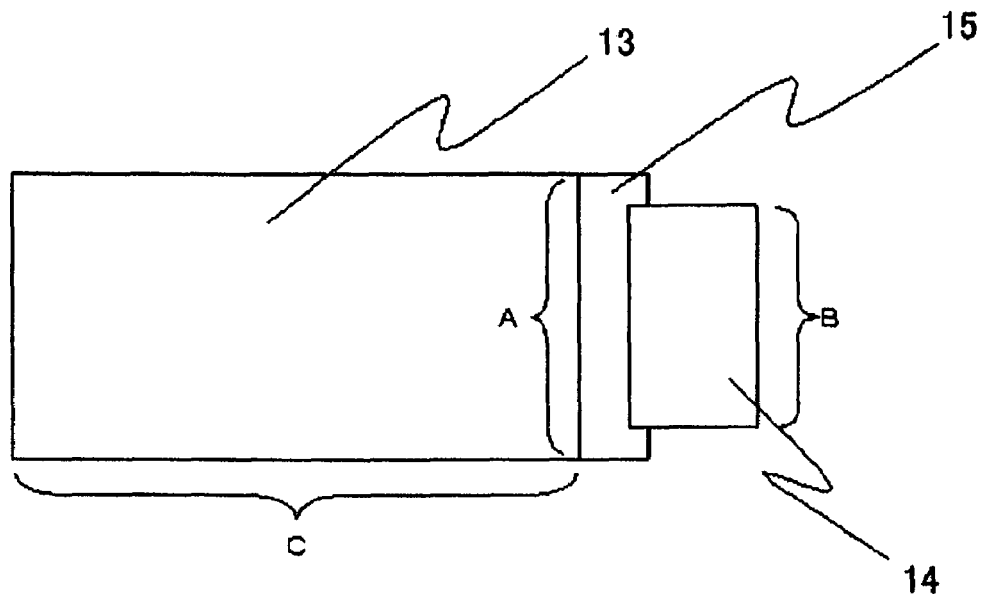
FIG. 4 is a schematic view for explaining a dimensional ratio of a negative electrode body or positive electrode body and an electrode terminal of a cell of the present invention.

FIG. 4 is a schematic view for explaining a dimensional ratio of the negative electrode body or positive electrode body and the electrode terminal of a flat-type cell according to the present invention. The active material region 13 is that region of the pertinent collecting body which is coated with an active material, and the electrode terminal attaching portion 15 is that region of the collecting body which is not coated with the active material. Mounted on the electrode terminal attaching portion 15 is an electrode terminal 14. In this figure, reference character "A" designates a width of the active material region, "B" a width of an electrode terminal, and "C" a length of the active material region.

Figure 24:
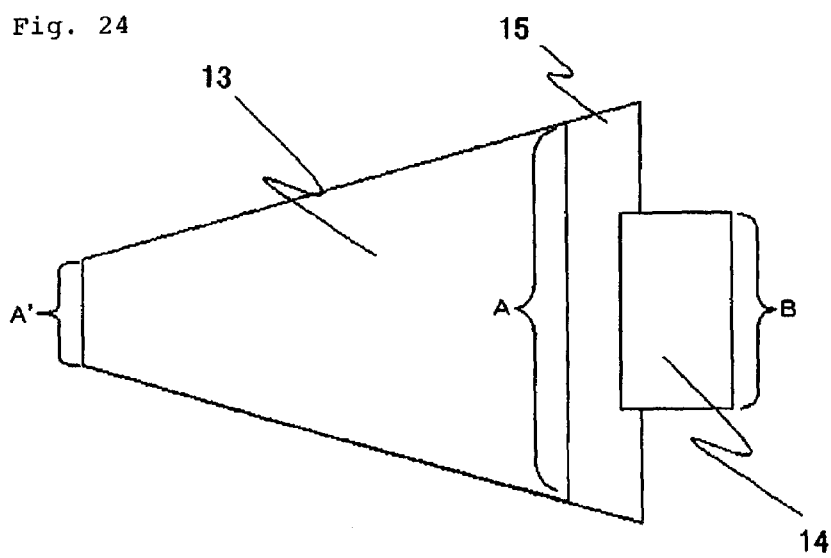
FIG. 24 is a schematic view for explaining a width of an active material region.
Figure 25:
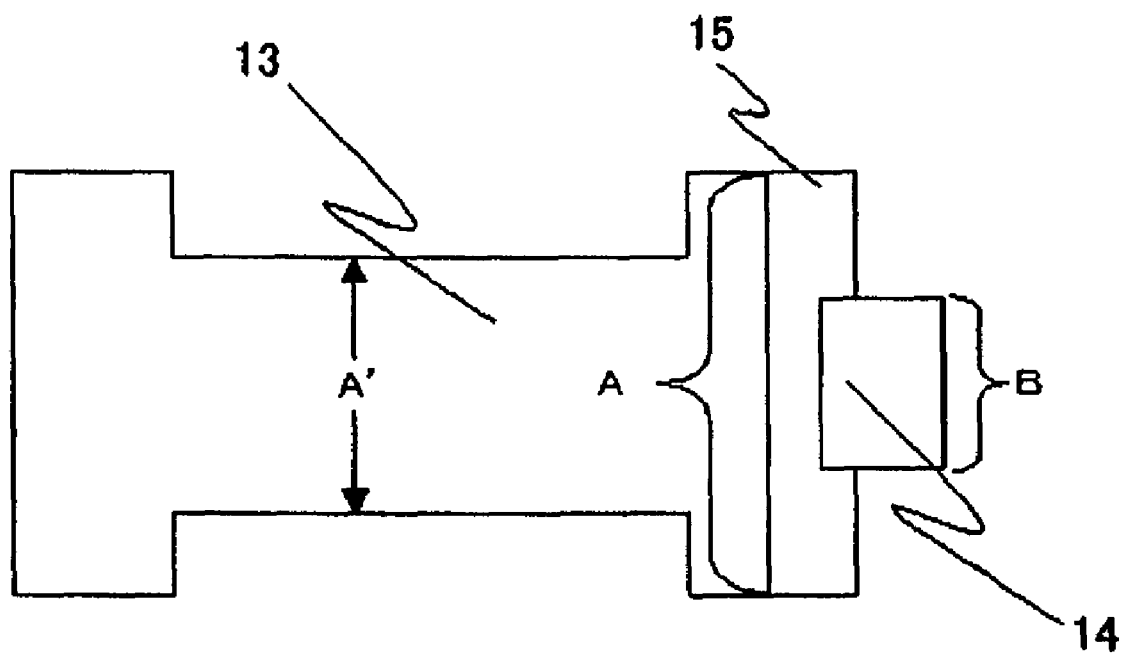
FIG. 25 is a schematic view for explaining a width of an active material region.

The active material region 13 shown in FIG. 4 is rectangular so that the width of the active material region 13 is constant. However, in case of a positive electrode body or negative electrode body having an active material region 13 in a shape shown in FIG. 24 or FIG. 25, the width of the active material region 13 varies depending on its position. The width of the active material region 13 in such a case means the narrowest width thereof in a direction perpendicular to the extending direction of the electrode terminal 14. Namely, the width of the active material region is not "A" but "A'" in FIGS. 24 and 25. This is because the electric current traveling distance to be described later herein is determined depending on the narrowest width of the active material region 13.

In the flat-type cell according to the present invention, the dimensions of the negative electrode body 1, positive electrode body 2, negative electrode terminal 4 and positive electrode terminal 5 are determined such that the value of B/A is 57% or more. Adopting such constitution enables the restriction of heat generation from the battery elements or cell elements. The reason thereof shall be described later.

The battery elements shown in FIG. 3 are housed within a film package 6, and then electrolyte is injected into the interior of the package, followed by sealing of the film to thereby obtain the film armored battery shown in FIG. 1. As the film package 6, it is possible to adopt a laminated film comprising at least two layers of a thin metal film and a heat sealable resin film.

There will be explained hereinafter the reason why it is possible to restrict the heat generation from the battery, in case of adopting the constitution where the value of B/A is 57% or more.

The noted reason is firstly because, increasing the width B of the pertinent electrode terminal decreases the resistance of the electrode terminal itself, thereby restricting the heat generation of the electrode terminal. In conventional batteries, values of B/A are approximately 10 to 30% in many cases, while the electrode terminals of positive and negative electrodes are frequently extended from one side of a pertinent battery thereby necessarily taking values less than 50% even in case of wider electrode terminals in order to avoid contact between electrode terminals of both electrodes. Contrarily, the present invention allows the attainment of the effect noted just above, because the value of B/A is 57% or more.

Figure 5:
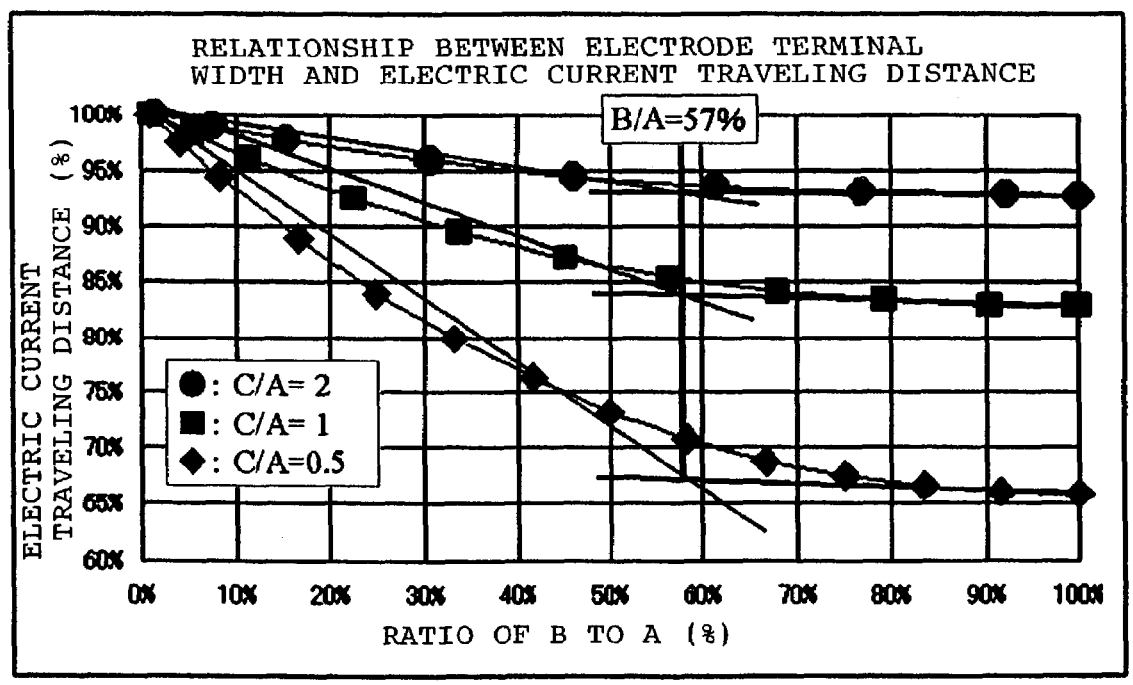
FIG. 5 is a graph showing a relationship between: a ratio of a terminal width to an electrode takeout width; and an electric current traveling distance.

The noted reason is secondly because, the value of B/A of 57% or more enables the shortening of the electric current traveling path, thereby restricting the heat generation from battery elements. Note, the electric current traveling distance in this embodiment refers to an averaged value of all theoretically possible electric current paths. FIG. 5 is a graph showing a relationship between the B/A, by obtaining electric current traveling distances based on simulations conducted in the model of FIG. 4. In this figure, the electric current traveling distance is shown in terms of a ratio, while the electric current traveling distance in case of a terminal width of 1 mm is defined as 100%. Since the heat generation value has a proportional relationship to the electric current traveling distance, more shortened electric current traveling distances will lead to restricted heat generation values. It is now understood by referring to FIG. 5 that the values of electric current traveling distances have smaller values in case of values of B/A of 57% or more, irrespective of the ratio of C and A. Thus, the heat generation values are effectively restricted when the value of B/A is 57% or more. Further, the shortened electric current traveling distances also have an effect of reducing the internal resistances of batteries, thereby also contributing to restricting heat generation from the battery elements.

Further, it is possible to regard the above described battery as a cell and to mutually connect a plurality of cells to thereby constitute a combined battery having a desired voltage and a desired capacity. For example, it is possible to obtain a combined battery of parallel-connection, by stacking such cells in a manner for juxtaposing and connecting positive electrodes with one another and negative electrodes with one another. It is also possible to obtain a combined battery of series-connection, by stacking such cells in a manner for alternately juxtaposing and connecting positive and negative electrodes. It is further possible to constitute combined batteries by using the parallel-connection and series-connection combination, thereby obtaining a series-connection type, parallel-connection type and series/parallel-connection type of combined batteries which have free layouts for effectively utilizing given spaces.

In such a combined battery, the internal resistance and the resistance of electrode terminals have been decreased in each cell, thereby effectively restricting the heat generation upon charging and discharging by an increased electric current, to thereby reduce the temperature rise of the combined battery as a whole. Further, it becomes unnecessary to conduct a heat-dissipation countermeasure construction to be otherwise applied to electrode terminals, thereby constituting a combined battery which is light-weight and inexpensive and has a higher reliability.

In this embodiment, there has been explained a situation where the electrode terminals of positive and negative electrodes are extended in the mutually opposite directions. However, it is possible to arrange the electrode terminals of positive and negative electrodes at two neighboring sides, respectively, or to arrange two pairs of electrode terminals of positive and negative electrodes at four sides, respectively. These constitutions advantageously increase the freedom degree of a layout in the plane direction.

EXAMPLE 1

There will be explained hereinafter the present invention in detail based on EXAMPLES.

As shown in FIGS. 2 and 3, there were alternately laminated: negative electrode bodies 1 each of which comprises a copper foil sheet of a 15 μm thickness coated with hard carbon at a thickness of about 50 μm on both surfaces; positive electrode bodies 2 each of which comprises an aluminum foil sheet of a 20 μm thickness coated with lithium-manganese complex oxide at a thickness of about 70 μm on both surfaces; and laminated type separators 3 each of which comprises an insulative porous resin thin-film sheet of a 25 μm thickness which is in itself constituted by laminating polyethylene films and polypropylene films. As shown in FIG. 3, the negative electrode collecting portions 7 and positive electrode collecting portions 8 were taken out in a manner not overlapping with the laminated electrical energy generating bodies, and the negative electrode collecting portions 7 and positive electrode collecting portions 8 were welded with the negative electrode terminal 4 made of nickel of 100 µm thickness and the positive electrode terminal 5 made of aluminum of 100 µm thickness, respectively, by means of ultrasonic welding and resistance welding. Thereafter, as shown in FIG. 1, this assembly was wrapped in a laminated film made of an aluminum foil of about 100 µm thickness, and then the interior is filled with an electrolyte prepared by dissolving lithium phosphate hexafluoride at a concentration of 1 mol/L in a nonaqueous solvent of propylene carbonate and methylethyl carbonate, followed by decompressive sealing to thereby fabricate a secondary battery. In this case, the outer size of the battery (except for projected electrode terminals) was 95 mm×160 mm, the size of the used negative electrode body 1 was 70 mm×125 mm, the size of the positive electrode body 2 was 65 mm×120 mm, the size of the laminated type separator 3 was 75 mm×130 mm, and the size of each of negative electrode terminal 4 and positive electrode terminal 5 was 40 mm length and 40 mm width. Thus, the values of B/A of the negative electrode and positive electrode were 0.57 and 0.62, respectively.

EXAMPLE 2

This EXAMPLE had the same constitution as EXAMPLE 1, except that the width of each of negative electrode terminal 4 and positive electrode terminal 5 was 50 mm. Thus, the values of B/A of the negative electrode and positive electrode were 0.71 and 0.77, respectively.

COMPARATIVE EXAMPLE 1

This COMPARATIVE EXAMPLE had the same constitution as the EXAMPLE 1, except that the width of each of negative electrode terminal 4 and positive electrode terminal 5 was 10 mm. Thus, the values of B/A of the negative electrode and positive electrode were 0.14 and 0.15, respectively.

COMPARATIVE EXAMPLE 2

This COMPARATIVE EXAMPLE had the same constitution as EXAMPLE 1, except that the width of each of negative electrode terminal 4 and positive electrode terminal 5 was 20 mm. Thus, the values of B/A of the negative electrode and positive electrode were 0.29 and 0.31, respectively.

COMPARATIVE EXAMPLE 3

This COMPARATIVE EXAMPLE had the same constitution as EXAMPLE 1, except that the width of each of negative electrode terminal 4 and positive electrode terminal 5 was 30 mm. Thus, the values of B/A of the negative electrode and positive electrode were 0.43 and 0.46, respectively.

This means that the value of B/A is 57% or more concerning EXAMPLES 1 and 2, and the value of B/A is less than 57% in each of COMPARATIVE EXAMPLES 1 through 3.

Figure 6:
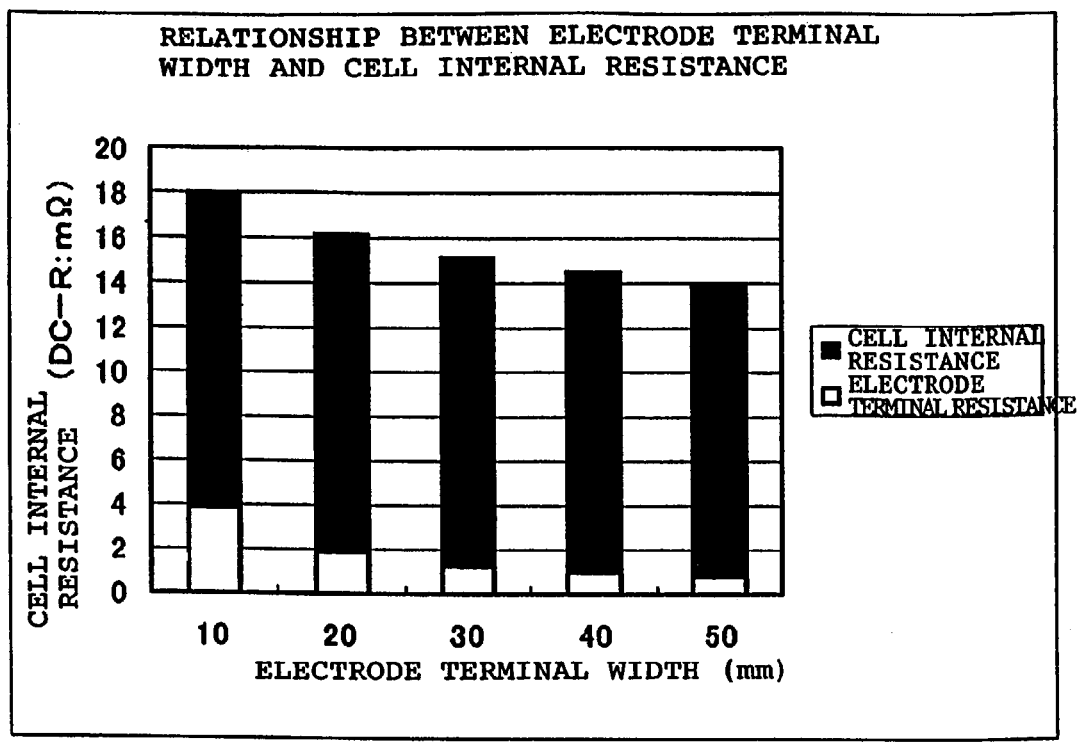
FIG. 6 is a graph showing a relationship between a terminal width and an internal resistance.

FIG. 6 shows a relationship between an electrode terminal width and a direct-current effective cell-resistance value in each of batteries of EXAMPLES 1, 2, and COMPARATIVE EXAMPLES 1 through 3. The direct-current effective cell-resistance value is a sum of terminal resistances and the resistance (cell internal resistance) of electrical energy generating elements. As understood, wider electrode terminal widths exhibit smaller terminal resistances, such that the resistance value in each of EXAMPLES 1 and 2 is decreased down to about 25% of that of the COMPARATIVE EXAMPLE 1.

Figure 7:
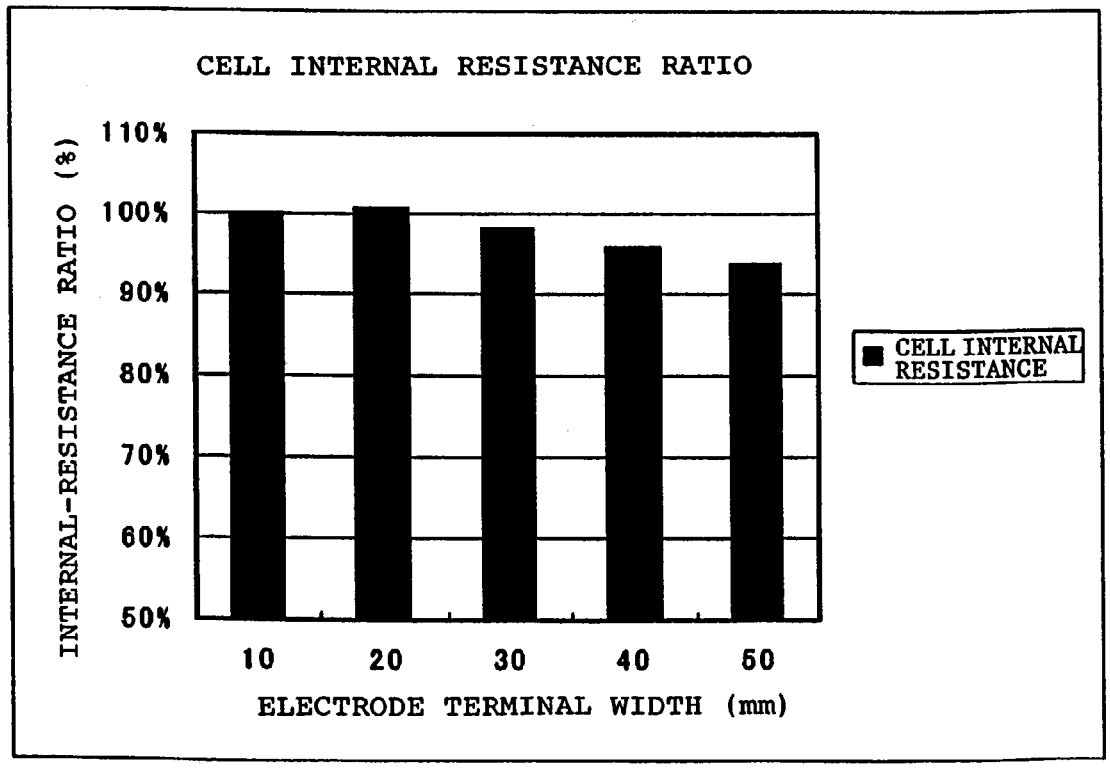
FIG. 7 is a graph showing a relationship between a terminal width and a cell internal-resistance ratio.

Further, considering a cell internal resistance ratio with reference to FIG. 7 while assuming that the cell internal resistance in case of the terminal width of 10 mm is 100%, it is understood that the cell internal resistance itself is also decreased in each of the electrode terminal widths according to the EXAMPLES 1 and 2. This effect is considered to be brought about by the shortened electric current traveling distances, and contributes to restricting heat generation from battery elements.

There will be a detailed explanation hereinafter of EXAMPLES of combined batteries which are constituted of a plurality of cells each consisting of the battery of EXAMPLE 1 or EXAMPLE 2.

EXAMPLE 3

Figure 8A:
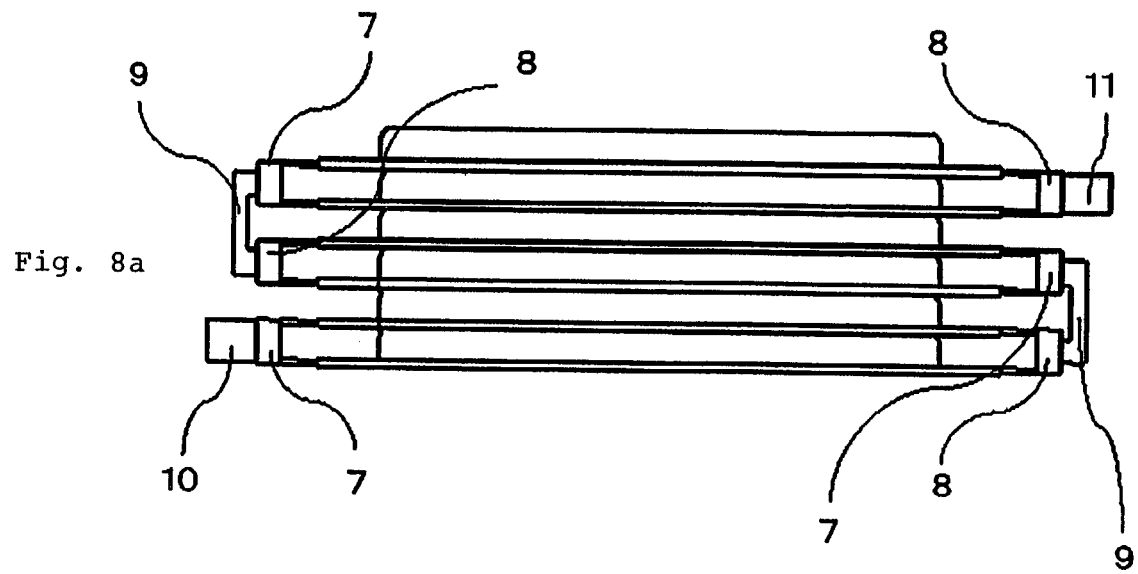
FIGS. 8a and 8b are a cross-sectional view for explaining a constitution of a combined battery of the present invention.

FIG. 8a shows a combined battery constituted by fabricating 3 each of two parallel connected cells, and by thereafter series connecting these cells. This shall be called a "3-series 2-parallel" type, and there shall be called a "Y-series X-parallel" type in case of series connecting Y parts of parallel connected X cells.

Firstly, there were prepared 3 each of 2-parallel-connection units, each consisting of stacked two cells, then the negative electrode collecting portions 7 and positive electrode collecting portions 8 of pertinent parallel-connection units were mutually connected by such as ultrasonic welding, spot welding or calking. Although there are provided collecting-portion connecting portions 9 for better understanding in FIG. 8a, these portions are the ones connected by welding or calking. The parallel-connection units were eventually stacked in 3 folds as shown in FIG. 8a, thereby obtaining a combined battery of a 3-series 2-parallel/collecting terminal double-side takeout type.

EXAMPLE 4

This EXAMPLE relates to a combined battery of a 2-series 3-parallel type.

Figure 8B:
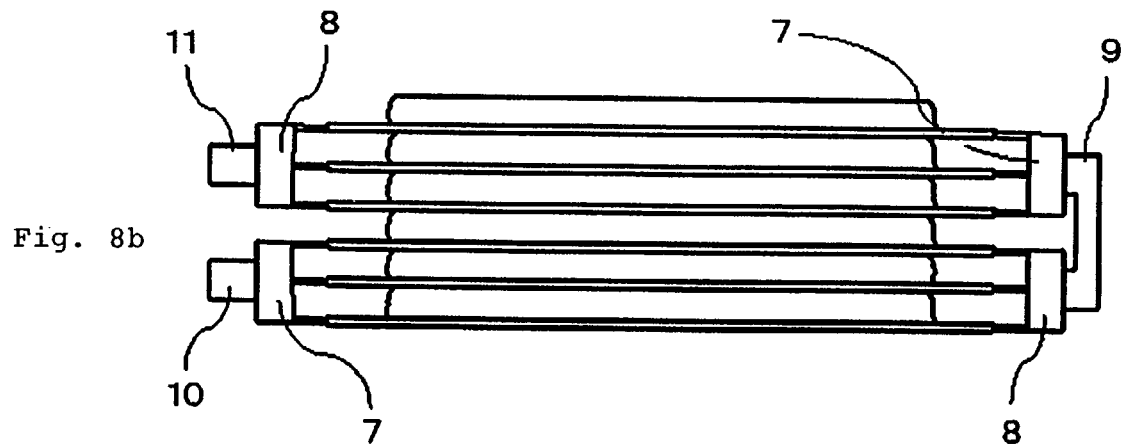

FIG. 8b is a view showing a constitution of a combined battery of a 2-series 3-parallel type. Firstly, there were prepared 2 each of 3-parallel-connection units each consisting of stacked three cells, then the positive electrode collecting portions 8 of one parallel-connection unit and the negative electrode collecting portions 7 of the other parallel-connection unit were mutually connected by ultrasonic welding, spot welding or calking. Although there is also provided a collecting-portion connecting portion 9 for better understanding in FIG. 8b, this portion is connected by welding or calking. The two of parallel-connection units were eventually stacked in 2 folds as shown in FIG. 8b, thereby obtaining a combined battery of a 2-series 3-parallel/collecting terminal single-side takeout type.

As shown in the EXAMPLE 3 and 4, it also becomes possible to arbitrarily take out collecting terminals from a single side or both sides of a combined battery, by varying the manner for mutually connecting electrode terminals.

Figure 9:
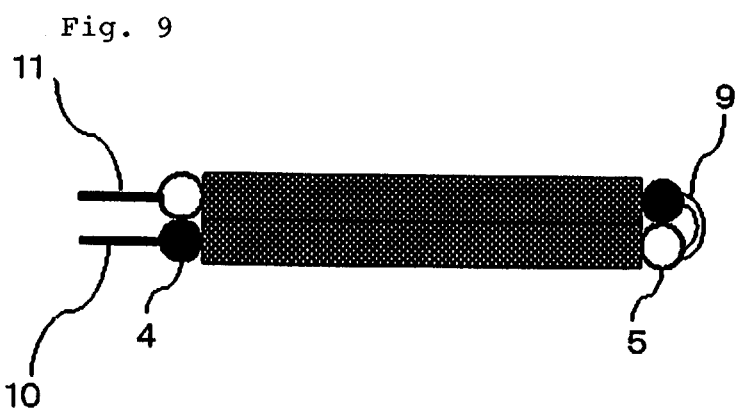
FIG. 9 is a schematic view for explaining a constitution of the combined battery.

There will be provided hereinafter several EXAMPLES for showing variations of combined batteries, and those marks in the pertinent figures to be used in explaining the EXAMPLES shall be firstly explained with reference to FIG. 9. FIG. 9 is a view showing a combined battery of a 2series 1-parallel type. In this figure, the black circle designates the negative electrode terminal 4, the white circle designates the positive electrode terminal 5, the meshed rectangle designates a cell, and the lines connecting the black circle and white circle designate the collecting-portion connecting portion 9. This collecting-portion connecting portion 9 is connected in the same manner as described in EXAMPLES 3 and 4. Further, the line taken out from negative electrode terminal 4 or negative electrode collecting portion 7 designates a negative electrode collecting terminal 10, while the line taken out from positive electrode terminal 5 or positive electrode collecting portion 8 designates a positive electrode collecting terminal 11. Further, in case of a series/parallel-connected combined battery, such a parallel-connected portion shown in FIG. 20 shall be regarded as a parallel-connected combined battery and shall be called a parallel-connection unit 12.

EXAMPLE 5

This EXAMPLE relates to a combined battery of a 6-series 1-parallel type.

Figure 10A:
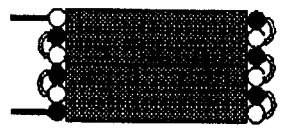
FIGS. 10a through 10d are a schematic view for explaining a constitution of the combined battery.
Figure 10B:
Figure 10C:
Figure 10D:

FIGS. 10a–d show a constitution of a combined battery of a 6-series 1-parallel type for series-connecting all of 6 cells. In case of the 6-series 1-parallel type, it is possible to stack the 6 cells at one position as shown in FIG. 10a, or to spread all the cells in a plane as shown in FIG. 10b without stacking them. It is further possible to stack the cells in a manner divided into two or three positions as shown in FIGS. 10c and 10d, thereby allowing an arbitrary lay out of the cells.

EXAMPLE 6

This EXAMPLE relates to a combined battery of a 6-parallel 1-series type.

Figure 11:
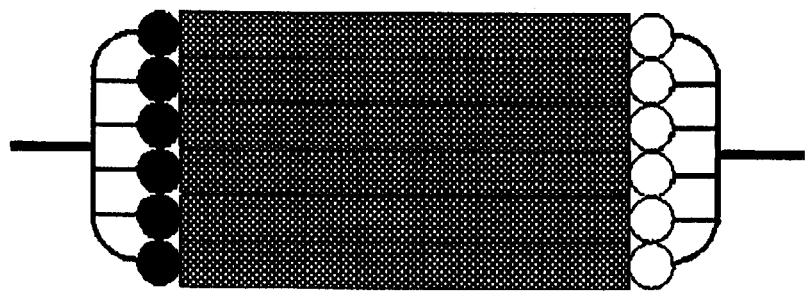
FIG. 11 is a schematic view for explaining a constitution of the combined battery.

FIG. 11 shows a combined battery of a 6-parallel 1-series type constituted by stacking the 6 cells in a manner for juxtaposing and connecting positive electrodes with one another and negative electrodes with one another. In case of the 6-parallel 1-series type, only this constitution is possible.

There have been described the embodiments of combined batteries according to the present invention in EXAMPLES 3 through 6. In these combined batteries, the internal resistance and the resistance of electrode terminals have been decreased in each cell, thereby allowing the effective restriction of heat generation upon charging and discharging by an increased electric current, to thereby reduce the rise in temperature of each combined battery as a whole. Further, it becomes unnecessary to conduct a heat-dissipation countermeasure construction to be otherwise applied to electrode terminals, thereby allowing the constitution of a combined battery which is light-weight and inexpensive and has a higher reliability.

Further, as shown in the above EXAMPLES, it becomes possible to obtain combined batteries of series-connection type, parallel-connection type and series/parallel-connection type which have arbitrary layouts and effectively utilize the given spaces, such as by aligning multiple cells in the plane direction, by vertically stacking and connecting cells, or by combining use in such manners.

In the above EXAMPLES, there have been shown exemplary combined batteries adopting 6 pieces of cells, and it is possible to attain various constitutions of combined batteries by changing the number of cells to be used and the number of positions for stacking the cells. These are exemplarily described hereinafter.

EXAMPLE 7

This EXAMPLE relates to a series-connected combined battery of a collecting terminal single-side takeout type.

Figure 12A:
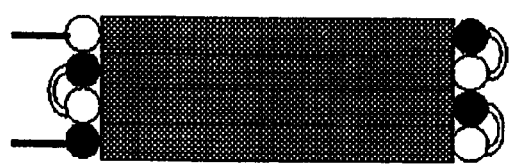
FIGS. 12a and 12b are a schematic view for explaining a constitution of a combined battery of a 4-series and single-sided collecting terminal takeout type.
Figure 12B:
Figure 13A:
FIGS. 13a through 13c are a schematic view for explaining a constitution of a combined battery of an 8-series and single-sided collecting terminal takeout type.
Figure 13B:
Figure 13C:

FIGS. 12a–b and 13a–c show exemplary constitutions of series-connected combined batteries of the collecting terminal single-side takeout type, respectively. FIGS. 12a–b show a combined battery constitution in case of 4-series, and FIGS. 13a–b show a combined battery constitution in case of 8-series. FIG. 12a shows a constitution in which 4 cells having alternately connected positive and negative electrodes are stacked in a 4-fold manner. FIG. 12b shows a constitution in which 4 cells having alternately connected positive and negative electrodes are stacked in a 2-fold manner. FIG. 13a shows a constitution in which 8 cells having alternately connected positive and negative electrodes are stacked in an 8-fold manner. FIG. 13b shows a constitution in which 8 cells having alternately connected positive and negative electrodes are stacked in a 4-fold manner. FIG. 13c shows a constitution in which 8 cells having alternately connected positive and negative electrodes are stacked in a 2-fold manner. As shown in FIGS. 12a–b and 13a–c, it is possible to realize a situation where collecting terminals are taken out from a single side in a series-connected combined battery, by adopting an even number of secondary batteries and by stacking them into an even number of folds. The even numbers of folds of the stacks are the common divisors of the number of constituting secondary batteries and the even number which does not exceed the number of secondary batteries. Combinations are present in as many as the number of such common divisors.

EXAMPLE 8

This EXAMPLE relates to a series-connected combined battery of a collecting terminal double-side takeout type.

Figure 14A:
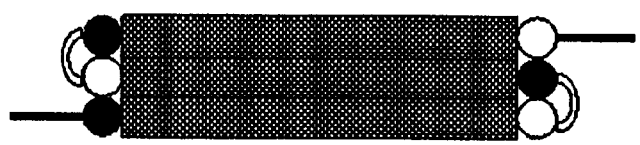
FIGS. 14a and 14b are a schematic view for explaining a constitution of a combined battery of a 3-series and double-sided collecting terminal takeout type.
Figure 14B:
Figure 15A:
FIGS. 15a and 15b are a schematic view for explaining a constitution of a combined battery of a 6-series and double-sided collecting terminal takeout type.
Figure 15B:
Figure 16A:
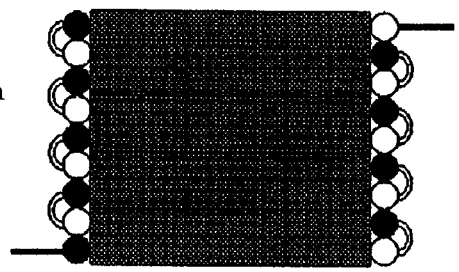
FIGS. 16a through 16c are a schematic view for explaining a constitution of a combined battery of a 9-series and double-sided collecting terminal takeout type.
Figure 16B:
Figure 16C:

FIGS. 14a–b through 16a–c show exemplary constitutions of series-connected combined batteries of the collecting terminal double-side takeout type. FIGS. 14a–b show a combined battery constitution in case of 3-series, FIGS. 15a–b show a combined battery constitution in case of 6-series, and FIGS. 16a–c show a combined battery constitution in case of 9-series. FIG. 14a shows a constitution in which 3 cells having alternately connected positive and negative electrodes are stacked in a 3-fold manner. FIG. 14b shows a constitution in which 3 cells having alternately connected positive and negative electrodes are placed in a 1-fold manner without stacking. FIG. 15a shows a constitution in which 6 cells having alternately connected positive and negative electrodes are stacked in a 3-fold manner. FIG. 15b shows a constitution in which 6 cells having alternately connected positive and negative electrodes are placed in a 1-fold manner without stacking. FIG. 16a shows a constitution in which 9 cells having alternately connected positive and negative electrodes are stacked in a 9-fold manner. FIG. 16b shows a constitution in which 9 cells having alternately connected positive and negative electrodes are stacked in a 3-fold manner. FIG. 16c shows a constitution in which 9 cells having alternately connected positive and negative electrodes are placed in a 1-fold manner without stacking.

As shown in FIGS. 14a–b through 16a–c, it is possible to realize a situation where collecting terminals are taken out from both sides in a series-connected combined battery, by stacking the secondary batteries in an odd number of folds irrespective of the number of secondary batteries. The odd numbers of folds of the stacking are the common divisors of the number of constituting secondary batteries and the odd number which does not exceed the number of secondary batteries. Combinations are present in as many as the number of such common divisors.

EXAMPLE 9

This EXAMPLE relates to a parallel-connected combined battery of a collecting terminal double-side takeout type.

Figure 17:
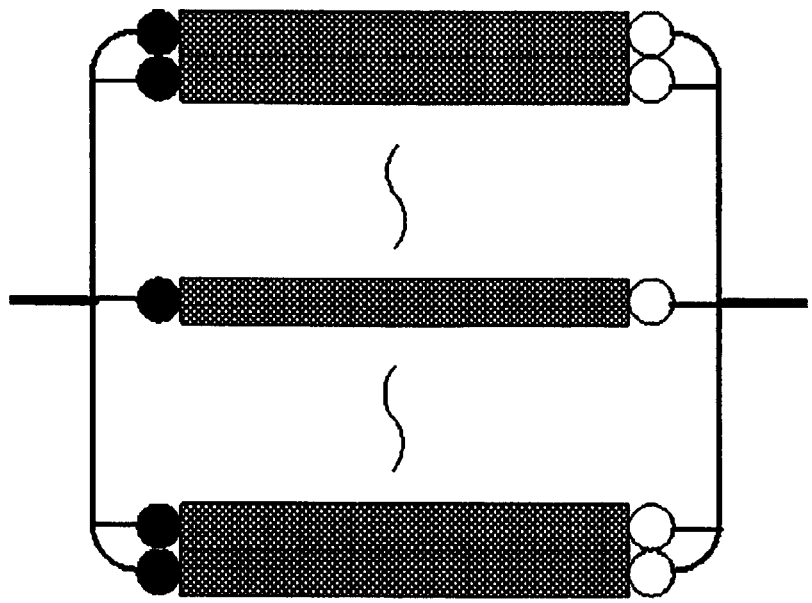
FIG. 17 is a schematic view for explaining a constitution of a parallel-connected combined battery of a double-sided collecting terminal takeout type.

FIG. 17 is a constitutional view of a parallel-connected combined battery. As understood from FIG. 17, it is constitutionally possible to attain the collecting terminal double-side takeout type in case of parallel-connection, by a structure for simply stacking the number of batteries corresponding to the parallel-connection.

EXAMPLE 10

This EXAMPLE relates to a series/parallel-connected combined battery of a collecting terminal single-side takeout type.

Figure 18:
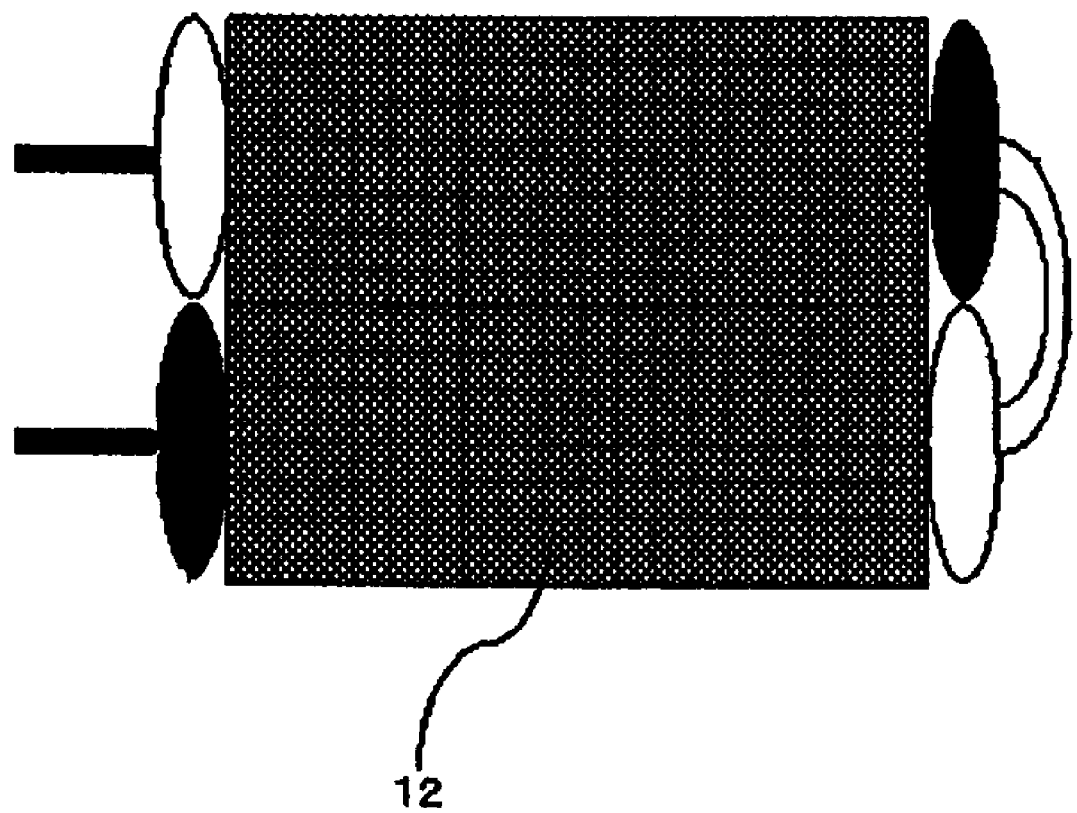
FIG. 18 is a schematic view for explaining a constitution of a series/parallel-connected combined battery of a 2-series 4-parallel and single-sided collecting terminal takeout type.
Figure 19A:
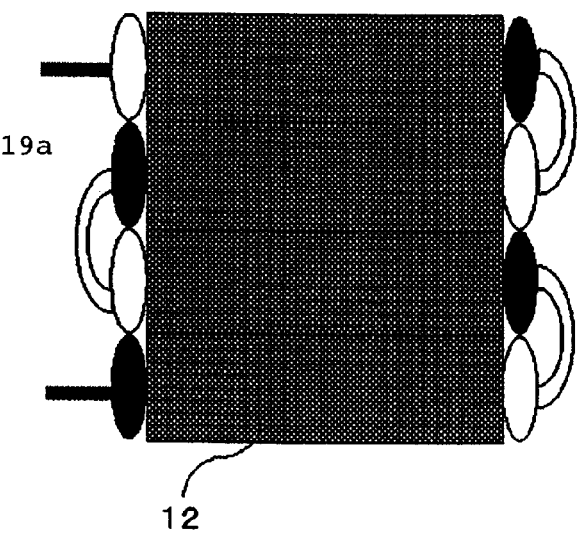
FIGS. 19a and 19b are a schematic view for explaining a constitution of a series/parallel-connected combined battery of a 4-series 3-parallel and single-sided collecting terminal takeout type.
Figure 19B:
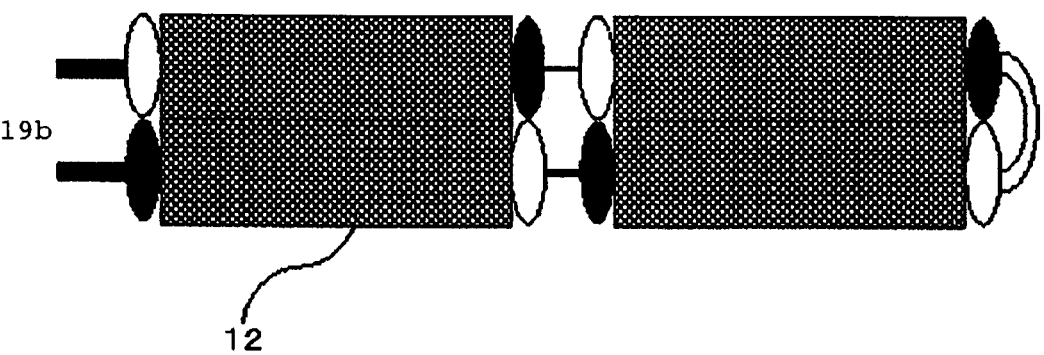
Figure 20A:
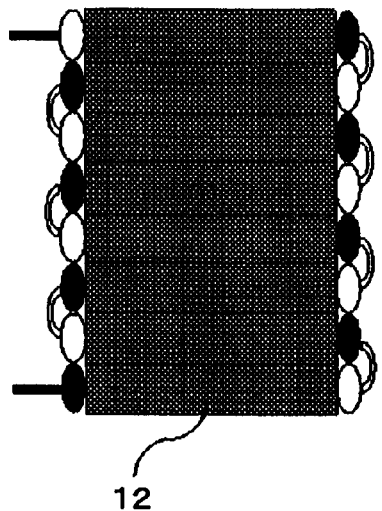
FIGS. 20a through 20c are a schematic view for explaining a constitution of a series/parallel-connected combined battery of an 8-series 2-parallel and single-sided collecting terminal takeout type.
Figure 20B:
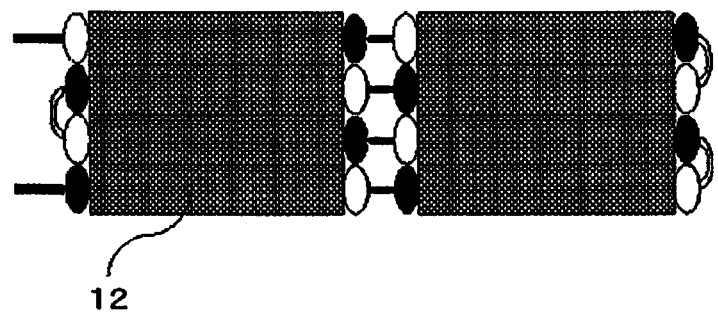
Figure 20C:
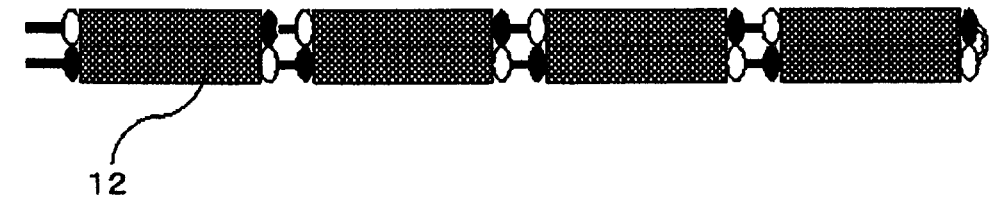

FIGS. 18 through 20a–c show exemplary constitutions of series/parallel-connected combined batteries of the collecting terminal single-side takeout type. FIG. 18 shows a combined battery constitution of a 2-series 4-parallel type, FIGS. 19a–b show a combined battery constitution of a 4-series 3-parallel type, and FIGS. 20a–c show a combined battery constitution of an 8-series 2-parallel type. FIG. 18 shows a constitution in which 2 parallel-connection units 12, each including stacked cells at the number corresponding to the parallel-connection number, are prepared from 8 cells. The parallel-connection units 12 are alternately connected positive and negative electrodes and stacked in a 2-fold manner. FIG. 19a shows a constitution in which 4 parallel-connection units 12, each including stacked cells at the number corresponding to the parallel-connection number, are prepared from 12 cells. The parallel-connection units 12 are alternately connected positive and negative electrodes and stacked in a 4-fold manner. FIG. 19b shows a constitution in which 4 parallel-connection units 12, each including stacked cells at the number corresponding to the parallel-connection number, are prepared from 12 cells. The parallel-connection units 12 are alternately connected positive and negative electrodes and stacked in a 2-fold manner. FIG. 20a shows a constitution in which 8 parallel-connection units 12, each including stacked cells at the number corresponding to the parallel-connection number, are prepared from 16 cells. The parallel-connection units 12 are alternately connected positive and negative electrodes and stacked in an 8-fold manner. FIG. 20b shows a constitution in which 8 parallel-connection units 12, each including stacked cells at the number corresponding to the parallel-connection number, are prepared from 16 cells. The parallel-connection units 12 are alternately connected positive and negative electrodes and stacked in a 4-fold manner. FIG. 20c shows a constitution in which 8 parallel-connection units 12, each including stacked cells at the number corresponding to the parallel-connection number, are prepared from 16 cells. The parallel-connection units 12 are alternately connected positive and negative electrodes and stacked in a 2-fold manner.

As shown in FIGS. 18 through 20a–c, it is possible to realize a situation where collecting terminals are taken out from a single side in a series-connected combined battery of a type equal to or greater than a 2-series 2-parallel type, in case of even-numbered series-connections adopting four or more cells such that the number of folds of parallel-connection units to be stacked is an even number. The numbers of folds of parallel-connection units to be stacked are common divisors of the number of constituting even-numbered series-connections and the even number. Combinations are present in as many as the number of such common divisors.

EXAMPLE 11

This EXAMPLE relates to a series/parallel-connected combined battery of a collecting terminal double-side takeout type.

Figure 21A:
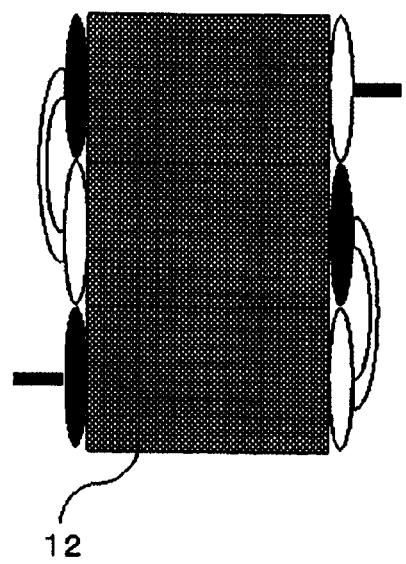
FIGS. 21a and 21b are a schematic view for explaining a constitution of a series/parallel-connected combined battery of a 3-series 6-parallel and double-sided collecting terminal takeout type.
Figure 21B:
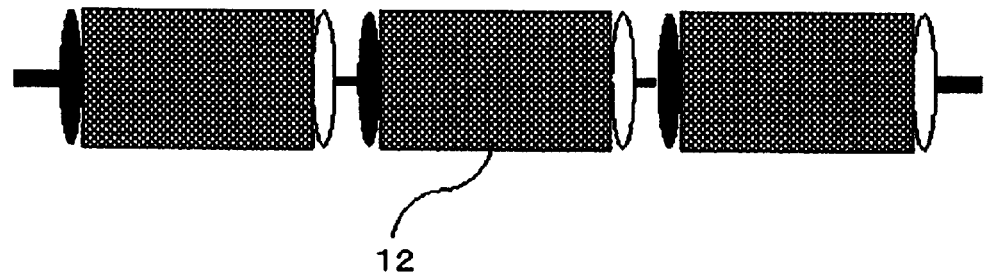
Figure 22A:
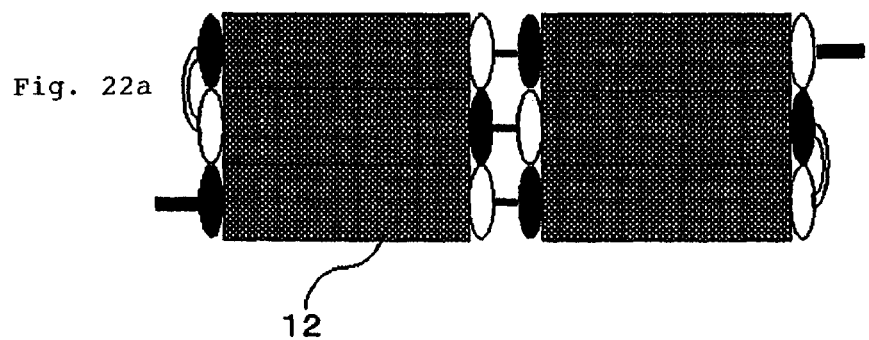
FIGS. 22a and 22b are a schematic view for explaining a constitution of a series/parallel-connected combined battery of a 6-series 3-parallel and double-sided collecting terminal takeout type.
Figure 22B:
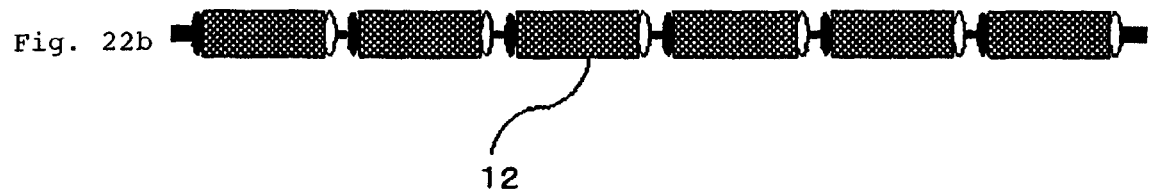
Figure 23A:
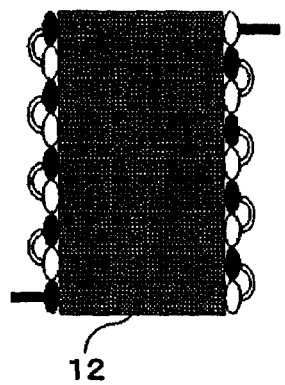
FIGS. 23a through 23c are a schematic view for explaining a constitution of a series/parallel-connected combined battery of a 9-series 2-parallel and double-sided collecting terminal takeout type.
Figure 23B:
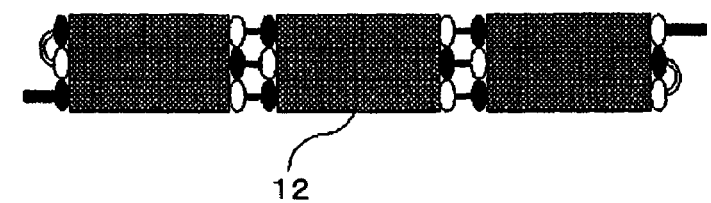
Figure 23C:
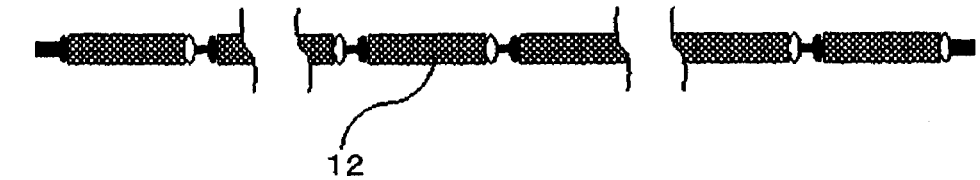

FIGS. 21a–b through 23a–c show exemplary constitutions of series/parallel-connected combined batteries of the collecting terminal double-side takeout type. FIGS. 21a–b show a combined battery constitution of a 3-series 6-parallel type, FIGS. 22a–b show a combined battery constitution of a 6-series 3-parallel type, and FIGS. 23a–c show a combined battery constitution of a 9-series 2-parallel type. FIG. 21a shows a constitution in which 3 parallel-connection units 12, each including stacked cells at the number corresponding to the parallel-connection number, are prepared from 18 cells. The parallel-connection units 12 are alternately connected positive and negative electrodes and stacked in a 3-fold manner. FIG. 21b shows a constitution in which 3 parallel-connection units 12, each including stacked cells at the number corresponding to the parallel-connection number, are prepared from 18 cells. The parallel-connection units 12 are alternately connected positive and negative electrodes and placed in a 1-fold manner without stacking. FIG. 22a shows a constitution in which 6 parallel-connection units 12, each including stacked cells at the number corresponding to the parallel-connection number, are prepared from 18 cells. The parallel-connection units 12 are alternately connected positive and negative electrodes and stacked in a 3-fold manner. FIG. 22b shows a constitution in which 6 parallel-connection units 12, each including stacked cells at the number corresponding to the parallel-connection number, are prepared from 18 cells. The parallel-connection units 12 are alternately connected positive and negative electrodes and placed in a 1-fold manner without stacking. FIG. 23a shows a constitution in which 9 parallel-connection units 12, each including stacked cells at the number corresponding to the parallel-connection number, are prepared from 18 pieces of cells. The parallel-connection units 12 are alternately connected positive and negative electrodes and stacked in a 9-fold manner. FIG. 23b shows a constitution in which 9 parallel-connection units 12, each including stacked cells at the number corresponding to the parallel-connection number, are prepared from 18 cells. The parallel-connection units 12 are alternately connected positive and negative electrodes and stacked in a 3-fold manner. FIG. 23c shows a constitution in which 9 parallel-connection units 12, each including stacked cells at the number corresponding to the parallel-connection number, are prepared from 18 cells. The parallel-connection units 12 are alternately connected positive and negative electrodes and placed in a 1-fold manner without stacking.

As shown in FIGS. 21a–b through 23a–c, it is possible to realize a situation where collecting terminals are taken out from both sides in a series-connected combined battery of a type equal to or greater than a 2-series 2-parallel type, in case of arbitrarily numbered series-connections adopting four or more cells such that the number of folds of parallel-connection units to be stacked is an odd number. The numbers of folds of parallel-connection units to be stacked are common divisors of the number of constituting numbered series-connections and the odd number. Combinations are present in as many as the number of such common divisors.

As shown in the above EXAMPLES, it becomes possible to obtain combined batteries of series-connection type, parallel-connection type and series/parallel-connection type which have arbitrary layouts and effectively utilize the given spaces, such as by aligning multiple cells in the plane direction, by vertically stacking and connecting cells, or by combining using such manners. Further, the internal resistance and the resistances of electrode terminals have been decreased in each cell, thereby allowing the effective restriction of heat generation upon charging and discharging by an increased electric current, to thereby reduce the rise in temperature of the combined battery as a whole even in case of usage as a combined battery. Further, it becomes unnecessary to conduct a heat-dissipation countermeasure construction to be otherwise applied to electrode terminals, thereby enabling the constitution of a combined battery which is light-weight and inexpensive and has a higher reliability.

According to the present invention as described above, it becomes possible to provide a flat-type cell of a reduced heat generation from battery elements or cell elements and electrode terminals to thereby attain a higher reliability, by constituting the cell such that the width A of the active material region and the width B of each electrode terminal satisfy $B/A \geq 0.57$.

Further, it becomes unnecessary to take a countermeasure against heat generation because the heat generation of the electrodes is low in the flat-type cell of the present invention, thereby enabling the constitution of a combined battery which is light-weight and inexpensive and has a higher space efficiency by combining a plurality of the flat-type cells.

While preferred embodiments of the present invention have been described using specific terms, such description is for illustrative purposes only, and it is to be understood that changes and variations may be made without departing from the spirit and scope of the following claims.

The invention claimed is:

1. A flat-type cell comprising:
a positive electrode terminal and a negative electrode terminal which are mutually separated and drawn out from an outer peripheral edge of said flat-type cell;
wherein said positive electrode terminal and said negative electrode terminal satisfy:

$$0.57 \leq B/A \leq 0.77$$

(wherein "A" represents the narrowest width of an active material region and "B" represents a width of each electrode terminal).

2. The flat-type cell according to claim 1, wherein said positive electrode terminal and said negative electrode terminal are drawn out in a mutually opposing manner.

3. The flat-type cell according to claim 1, further comprising a package made of a thin metal film.

4. The flat-type cell according to claim 1, further comprising a package made of a laminated film which includes a thin metal film and a heat sealable resin film.

5. The flat-type cell according to claim 4, wherein said thin metal film is aluminum.

6. A combined battery comprising:
a plurality of flat-type cells according to claim 1;
wherein said plurality of flat-type cells are combined with one another via said positive electrode terminals or said negative electrode terminals.

7. The combined battery according to claim 6, wherein said plurality of flat-type cells are connected in series, respectively.

8. The combined battery according to claim 7, wherein said plurality of flat-type cells are stacked.

9. The combined battery according to claim 6, wherein said plurality of stacked flat-type cells are mutually parallel connected.

10. A combined battery comprising:
a plurality of combined batteries according to claim 9;
wherein said plurality of combined batteries are mutually series connected.

11. The flat-type cell according to claim 1, further comprising at least one additional positive electrode and at least one additional negative electrode where each of the positive electrode and the at least one additional positive electrode and the negative electrode and the at least one additional negative electrode of said flat-type cell are disposed in different planes.

* * * * *